US011086938B2

(12) United States Patent
Tellex et al.

(10) Patent No.: US 11,086,938 B2
(45) Date of Patent: Aug. 10, 2021

(54) INTERPRETING HUMAN-ROBOT INSTRUCTIONS

(71) Applicant: BROWN UNIVERSITY, Providence, RI (US)

(72) Inventors: Stefanie Tellex, Cambridge, MA (US); Dilip Arumugam, Providence, RI (US); Siddharth Karamcheti, Los Altos Hills, CA (US); Nakul Gopalan, Providence, RI (US); Lawson L. S. Wong, Sar (HK)

(73) Assignee: Brown University, Providence, RI (US)

(*) Notice: Subject to any disclaimer, the term of this patent is extended or adjusted under 35 U.S.C. 154(b) by 0 days.

(21) Appl. No.: 16/806,706

(22) Filed: Mar. 2, 2020

(65) Prior Publication Data

US 2020/0201914 A1 Jun. 25, 2020

Related U.S. Application Data

(63) Continuation of application No. 15/957,651, filed on Apr. 19, 2018, now Pat. No. 10,606,898.
(Continued)

(51) Int. Cl.
| | | |
|---|---|---|
| G05D 1/00 | (2006.01) | |
| G01C 21/00 | (2006.01) | |
| G06F 16/9032 | (2019.01) | |
| G06N 3/08 | (2006.01) | |
| G06F 15/76 | (2006.01) | |
| G06N 3/04 | (2006.01) | |
| G06N 7/00 | (2006.01) | |
| G06N 3/00 | (2006.01) | |

(Continued)

(52) U.S. Cl.
CPC ........ *G06F 16/90332* (2019.01); *G06F 15/76* (2013.01); *G06F 40/42* (2020.01); *G06N 3/008* (2013.01); *G06N 3/0445* (2013.01); *G06N 3/0454* (2013.01); *G06N 3/08* (2013.01); *G06N 7/005* (2013.01); *G06N 20/00* (2019.01); *G10L 2015/223* (2013.01); *G10L 2015/225* (2013.01)

(58) Field of Classification Search
CPC ................................. G05D 1/00; G01C 21/00
See application file for complete search history.

(56) References Cited

U.S. PATENT DOCUMENTS

| 7,174,300 B2* | 2/2007 | Bush ...................... G10L 15/22 |
| | | 704/270 |
| 9,015,093 B1* | 4/2015 | Commons .......... G01C 21/3602 |
| | | 706/26 |

(Continued)

OTHER PUBLICATIONS

"Google Speech API. https://cloud.google.com/speech/, 2017", Accessed: Jan. 30, 2017.
(Continued)

*Primary Examiner* — Shreyans A Patel
(74) *Attorney, Agent, or Firm* — Adler Pollock & Sheehan P.C.

(57) ABSTRACT

A system includes a robot having a module that includes a function for mapping natural language commands of varying complexities to reward functions at different levels of abstraction within a hierarchical planning framework, the function including using a deep neural network language model that learns how to map the natural language commands to reward functions at an appropriate level of the hierarchical planning framework.

3 Claims, 5 Drawing Sheets

Related U.S. Application Data

(60) Provisional application No. 62/487,294, filed on Apr. 19, 2017.

(51) Int. Cl.
  *G06F 40/42*   (2020.01)
  *G10L 15/22*   (2006.01)
  *G06N 20/00*   (2019.01)

(56) References Cited

U.S. PATENT DOCUMENTS

| | | | | |
|---|---|---|---|---|
| 9,754,221 | B1* | 9/2017 | Nagaraja | G06N 3/08 |
| 10,606,898 | B2* | 3/2020 | Tellex | G06N 3/0454 |
| 2011/0295399 | A1* | 12/2011 | Plociennik | B22D 33/00 700/97 |
| 2016/0161946 | A1* | 6/2016 | Wuth Sepulveda | G05D 1/0022 701/2 |
| 2018/0022361 | A1* | 1/2018 | Rao | B60W 30/143 701/23 |
| 2019/0025917 | A1* | 1/2019 | Francis | A61B 5/0476 |
| 2019/0057696 | A1* | 2/2019 | Ogawa | G10L 25/51 |

OTHER PUBLICATIONS

Bellman, "Dynamic Programming", Princeton University Press, Princeton, NJ, USA, 1 edition, 1957, 27 pages.
Bengio, et al., "A Neural Probabilistic Language Model", Journal of Machine Learning Research, vol. 3, 2000, 7 pages.
Brown, et al., "A Statistical Approach to Machine Translation.", Computational Linguistics, vol. 16, No. 2, 1990, pp. 79-85.
Brown, et al., "The Mathematics of Statistical Machine Translation: Parameter Estimation", Computational Linguistics, vol. 19, Issue 2, Jun. 1993, pp. 263-311.
Chen, et al., "Learning to Interpret Natural Language Navigation Instructions From Observations", In AAAI Conference on Artificial Intelligence, 2011, 7 pages.
Cho, et al., "Learning Phrase Representations using RNN Encoder-Decoder for Statistical Machine Translation", In Empirical Methods in Natural Language Processing, 2014.
Chung, et al., "Empirical Evaluation of Gated Recurrent Neural Networks on Sequence Modeling", CaRR, abs/1412.3555, 2014, 9 pages.
Dieterrich, "Hierarchical Reinforcement Learning with the MAXQ Value Function Decomposition", Journal on Artificial Intelligence Research, vol. 13, 2000, pp. 227-303.
Diuk, et al., "An Object-Oriented Representation for Efficient Reinforcement Learning", Proceeding of the 25th International Conference on Machine Learning, 2008, 8 pages.
Gopalan, et al., "Planning with Abstract Markov Decision Processes", In International Conference on Machine Learning Workshop on Abstraction in Reinforcement Learning, 2016, 9 pages.
Howard, et al., "A Natural Language Planner Interface for Mobile Manipulators", In IEEE International Conference on Robotics and Automation, 2014, 8 pages.
Iyyer, et al., "Deep Unordered Composition Rivals Syntactic Methods for Text Classification", In Conference of the Association for Computational Linguistics, 2015, 11 pages.
Jong, et al., "Hierarchical Model-Based Reinforcement Learning: R-MAX + MAXQ", In the 25th International Conference on Machine Learning, Jul. 2008, 8 pages.
Junghanns, "Sokoban: A Challenging Single-Agent Search Problem", In International Joint Conference on Artificial Intelligence Workshop on Using Games as an Experimental Testbed for AI Reasearch, 1997, 16 pages.
Kingma, et al., "Adam: A Method for Stochastic Optimization", CaRR, abs/1412.6980, 2014, 15 pages.
Macglashan, et al., "Grounding English Commands to Reward Functions", In Robotics: Science and Systems, 2015, 10 pages.
Macmahan, et al., "Bounded Real-Time Dynamic Programming: RTDP with monotone upper bounds and performance guarantees", In International Conference on Machine Learning, 2005, 8 pages.
Macmahon, et al., "Walk the Talk: Connecting Language, Knowledge, and Action in Route Instructions", In American Association for Artificial Intelligence, vol. 2, 2006, pp. 1475-1482.
Matuszek, et al., "Learning to Parse Natural Language Commands to a Robot Control System", In International Symposium on Experimental Robotics, 2012, 14 pages.
McGovern, et al., "Roles of Macro-Actions in Accelerating Reinforcement Learning", Grace Hopper Celebration of Women in Computing, 1997, 5 pages.
Mikolov, et al., "Efficient Estimation of Word Representations in Vector Space", CaRR, abs/1301.3781, 2013, 12 pages.
Mikolov, et al., "Extensions of Recurrent Neural Network Language Model", In IEEE International Conference on Acoustics, Speech, and Signal Processing, 2011, 4 pages.
Mikolov, et al., "Recurrent Neural Network Based Language Model", In Interspeech, 2010, 4 pages.
Paul, et al., "Efficient Grounding of Abstract Spatial Concepts for Natural Language Interaction with Robot Manipulators", In Robotics: Science and Systems, 2016, 9 pages.
Quigley, et al., "ROS: An open-source Robot Operating System", In IEEE International Conference on Robotics and Automation Workshop on Open Source Software, 2009.
Srivastava, et al., "Dropout: A Simple Way to Prevent Neural Networks From Overfitting.", Journal of Machine Learning Research, vol. 15, 2014, pp. 1929-1958.
Sutskever, et al., "Sequence to Sequence Learning with Neural Networks", CaRR, abs/1409.3215, 2014, 9 pages.
Sutton, et al., "Between MDPs and semi-MDPs: A framework for temporal abstraction in reinforcement learning", Artificial Intelligence, vol. 112, 1999, pp. 181-211.
Tellex, et al., "Understanding Natural Language Commands for Robotic Navigation and Mobile Manipulation", In 25th AAAI Conference on Artificial Intelligence, 2011, pp. 1507-1514.

\* cited by examiner

| Level | Example Command | Reward Function |
|---|---|---|
| L0 | Turn and move one spot to the right. Go three down, four over, two up. | goWest agentInRoom agent0 room1 |
| L1 | Go to door, enter red room, push chair to green room door. Go to the door then go into the red room. | blockInRegion block0 room1 agentInRegion agent0 room0 |
| L2 | Go to the green room. Bring the chair to the blue room. | agentInRegion agent0 room1 blockInRegion block0 room2 |

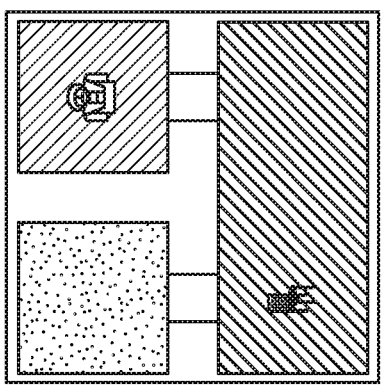

FIG. 3

INTERPRETING HUMAN-ROBOT INSTRUCTIONS

CROSS REFERENCE TO RELATED APPLICATIONS

The application is a Continuation of U.S. patent application Ser. No. 15/957,651, filed Apr. 19, 2018, which claims benefit from U.S. Provisional Patent Application Ser. No. 62/487,294, filed Apr. 19, 2017, which are incorporated by reference in their entireties.

STATEMENT REGARDING GOVERNMENT INTEREST

This invention was made with government support under grant number 1637614 awarded by the National Science Foundation, grant number W911NF-15-1-0503 awarded by the U.S. Army Research Office and grant number NNX16AR61G awarded by National Aeronautics and Space Administration. The government has certain rights in the invention.

BACKGROUND OF THE INVENTION

The invention generally relates to robots, and more specifically to interpreting human-robot instructions.

In general, humans can ground natural language commands to tasks at both abstract and fine-grained levels of specificity. For instance, a human forklift operator can be instructed to perform a high-level action, like "grab a pallet" or a low-level action like "tilt back a little bit." While robots are also capable of grounding language commands to tasks, previous methods implicitly assume that all commands and tasks reside at a single, fixed level of abstraction. Additionally, those approaches that do not use abstraction experience inefficient planning and execution times due to the large, intractable state-action spaces, which closely resemble real world complexity.

Existing approaches generally map between natural language commands and a formal representation at some fixed level of abstraction. While effective at directing robots to complete predefined tasks, mapping to fixed sequences of robot actions is unreliable when faced with a changing or stochastic environment.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a system including a robot having a module to interpret human-robot instructions of varying granularities.

In another aspect, the invention features a system having a robot including a function for mapping natural language commands of varying complexities to reward functions at different levels of abstraction within a hierarchical planning framework, the function including using a deep neural network language model that learns how to map the natural language commands to reward functions at an appropriate level of the hierarchical planning framework.

In still another aspect, the invention features a method including providing a mobile-manipulator robot, and providing a module that interprets and grounds natural language commands to a mobile-manipulator robot at multiple levels of abstraction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 3 illustrates an exemplary Amazon Mechanical Turk (AMT) dataset statistics and examples.

DETAILED DESCRIPTION

Figure 1:
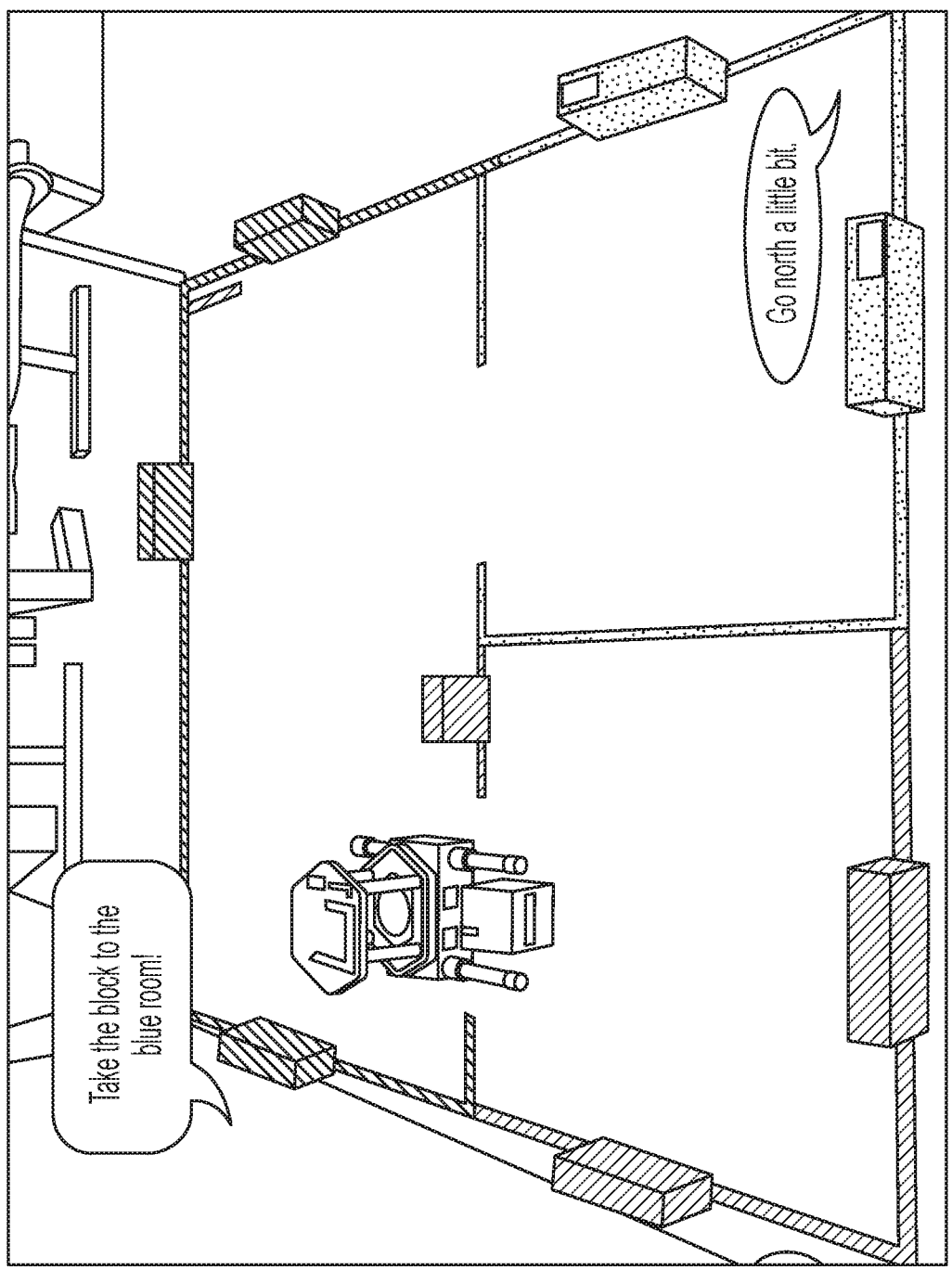
FIG. 1 illustrates an exemplary room.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

To address the problems of the past, the present invention provides an approach for mapping natural language commands of varying complexities to reward functions at different levels of abstraction within a hierarchical planning framework. The approach enables a system to quickly and accurately interpret both abstract and fine-grained commands. The system uses a deep neural network language model that learns how to map natural language commands to the appropriate level of the planning hierarchy. By coupling abstraction level inference with the overall grounding problem, the present invention fully exploits the subsequent hierarchical planner to efficiently execute the grounded tasks.

To interpret a variety of natural language commands, there must be a representation for all possible tasks and subtasks. An MDP is a five-tuple of (S, A, T, R, y) where S represents the set of states that define an environment, A denotes the set of actions an agent can execute to transition between states, T defines the transition probability distribution over all possible next states given a current state and executed action, R defines the numerical reward earned for a particular transition, and y represents the discount factor or effective time horizon under consideration. Planning in an MDP produces a mapping between states and actions, or policy, that maximizes the total expected discounted reward.

An OO-MDP builds upon an MDP by adding sets of object classes and propositional functions; each object class is defined by a set of attributes and each propositional function is parameterized by instances of object classes. For example, an OO-MDP for the mobile robot manipulation domain seen in FIG. 1 might denote the robot's successful placement of the colored block into the colored room via the propositional function blockInRoom block0 room 1, where block0 and room 1 are instances of the block and room object classes respectively and the blockInRoom propositional function checks if the location attribute of block0 is contained in room1. Using these propositional functions as reward functions that encode termination conditions for each task, we arrive at a sufficient, semantic representation for grounding language. For our evaluation, we use the Cleanup World OO-MDP, which models a mobile manipulator robot.

An Abstract Markov Decision Process (AMDP) builds upon an OO-MDP by including a predefined hierarchy over the state-action space. In order to effectively ground commands across multiple levels of complexity, we assume a predefined hierarchy over the state-action space of the given grounding environment. Furthermore, each level of this hierarchy requires its own set of reward functions for all relevant tasks and sub-tasks. In the present invention, fast planning and the ability to ground and solve individual subtasks without needing to solve the entire planning problem make AMDPs a reliable choice for the hierarchical planner. Finally, we assume that all commands are generated from a single, fixed level of abstraction. In our framework, we map between a sequence of words in language and a specific AMDP reward function.

Given a natural language command c, we find the corresponding level of the abstraction hierarchy l, and the reward function m that maximizes the joint probability of l, m given c. Concretely, we seek the level of the state-action hierarchy l and the reward function m such that:

$$\hat{l}, \hat{m} = \arg\max_{l,m} Pr(l, m \mid c) \qquad (1)$$

For example, a high-level natural language command like "Take the block to the color room" (as shown at the top of FIG. 1) would map to the highest level of abstraction while a low-level command like "Go north a little bit" (as shown at the bottom of FIG. 1) would map to the finest-grained level of abstraction. We estimate this joint probability by learning a language model and training on a parallel corpus that pairs natural language commands with a corresponding reward function at a particular level of the abstraction hierarchy.

Given this parallel corpus, we train each model by directly maximizing the joint probability. Specifically, we learn a set of parameters θ that maximize the following corpus likelihood:

$$\hat{\theta} = \arg\max_{\theta} \prod_{(c,l,m) \in C} Pr(l, m \mid c, \theta) \qquad (2)$$

At inference time, given an language command c, we find the best l, m that maximize the probability Pr(l, m|c, θ). The reward function m is then passed to a hierarchical planner, which plans the corresponding task at abstraction level l.

In the present invention, four language models are compared: an IBM Model 2 translation model, a deep neural network bag-of-words language model, and two sets of recurrent neural network language models, with varying architectures.

As a baseline, task grounding is recast as a machine translation problem with a source language defined by natural language and a target language defined by semantic task representations (reward functions). We use the IBM Model 2 (IBM2) machine translation model as a statistical language model for scoring reward functions based on some input command. IBM2 is a generative model that solves the following objective by Bayes' rule:

$$\hat{l}, \hat{m} = \arg\max_{l,m} Pr(l, m) \cdot Pr(c \mid l, m) \qquad (3)$$

We evaluate three classes of neural network architectures (see FIGS. 2A, 2B and 2C): a feed-forward network that takes a natural language command encoded as a bag-of-words and has separate parameters for each level of abstraction (Multi-NN), a recurrent network that takes into account the order of words in the sequence, also with separate parameters (Multi-RNN), and a recurrent network that takes into account the order of words in the sequence and has a shared parameter space across levels of abstraction (Single-RNN).

(1) Multi-NN: Multiple Output Feed-Forward Network

We created a feed-forward neural network that takes in a natural language command as a bag-of-words, and outputs both the probability of each of the different levels of abstraction, as well as the probability of each reward function. Specifically, we decompose the conditional probability as Pr(l, m|c)=P(l|c)Pr(m|l, c). If we represent our natural language command c as a bag-of-words vector c, the Multi-NN objective is to find a set of parameters θ such that:

$$\hat{\theta} = \arg\max_{\theta} \sum_{(\vec{c},l,m)} \log Pr(l \mid \vec{c}, \theta) + \log Pr(m \mid l, \vec{c}, \theta) \qquad (4)$$

This follows by taking a logarithm of the corpus objective outlined in Equation 2.

Figure 2A:
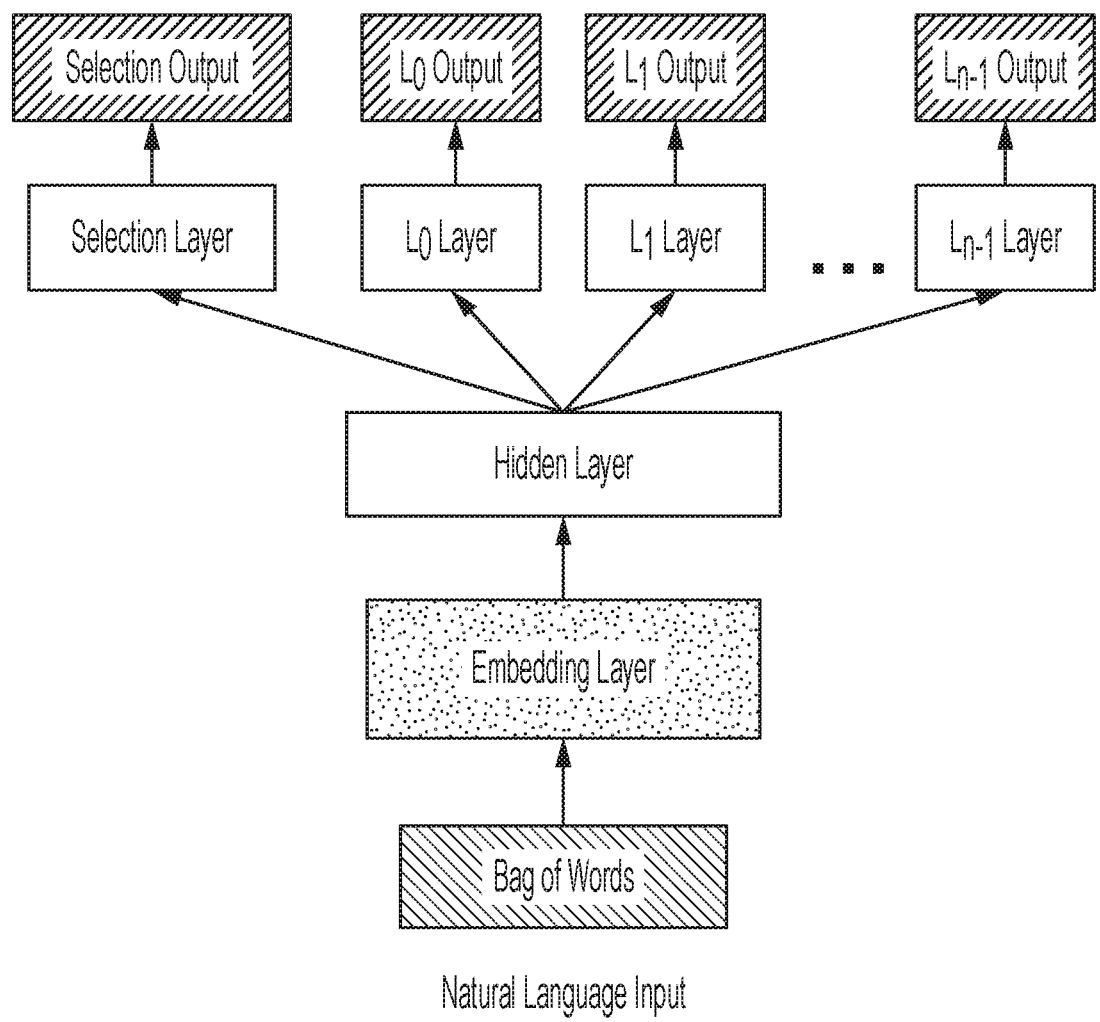
FIG. 2A, FIG. 2B and FIG. 2C illustrate three classes of exemplary neural network architectures.

To learn this set of parameters, we use the architecture shown in FIG. 2A. Namely, we employ a multi-output deep neural network with an initial embedding layer, a hidden layer that is shared between each of the different outputs, and then output-specific hidden and read-out layers, respectively.

The level selection output is a k-element discrete distribution, where k is the number of levels of abstraction in the given planning hierarchy. Similarly, the reward function output at each level $L_i$ is an $r_i$-element distribution, where $r_i$ is the number of reward functions at the given level of the hierarchy.

To train the model, we minimize the sum of the cross-entropy loss on each term in Equation 4. We train the network via backpropagation, using an Adam Optimizer, with a mini-batch size of 16, and a learning rate of 0.001. Furthermore, to better regularize the model and encourage robustness, we use Dropout after the initial embedding layer, as well as after the output-specific hidden layers with probability p=0.5.

(2) Multi-RNN: Multiple Output Recurrent Network:

The present invention includes a recurrent neural network language model that takes in a command as a sequence of words and, like the Multi-NN bag-of-words model, outputs both the probability of each of the different levels of abstraction, as well as the probability of each reward function, at each of the different levels of abstraction. Recurrent Neural Networks are extensions of feed-forward networks that can handle variable length inputs. They do this by employing a set of one or more hidden states which update after reading in each input token. If we represent the natural language command c as a sequence of words $s=(c_1, c_2 \ldots c_n)$, the Multi-RNN objective is to find a set of parameters such that:

$$\hat{\theta} = \arg\max_{\theta} \sum_{(c,l,m)} \log Pr(l \mid s, \theta) + \log Pr(m \mid l, s, \theta) \quad (5)$$

Figure 2B:
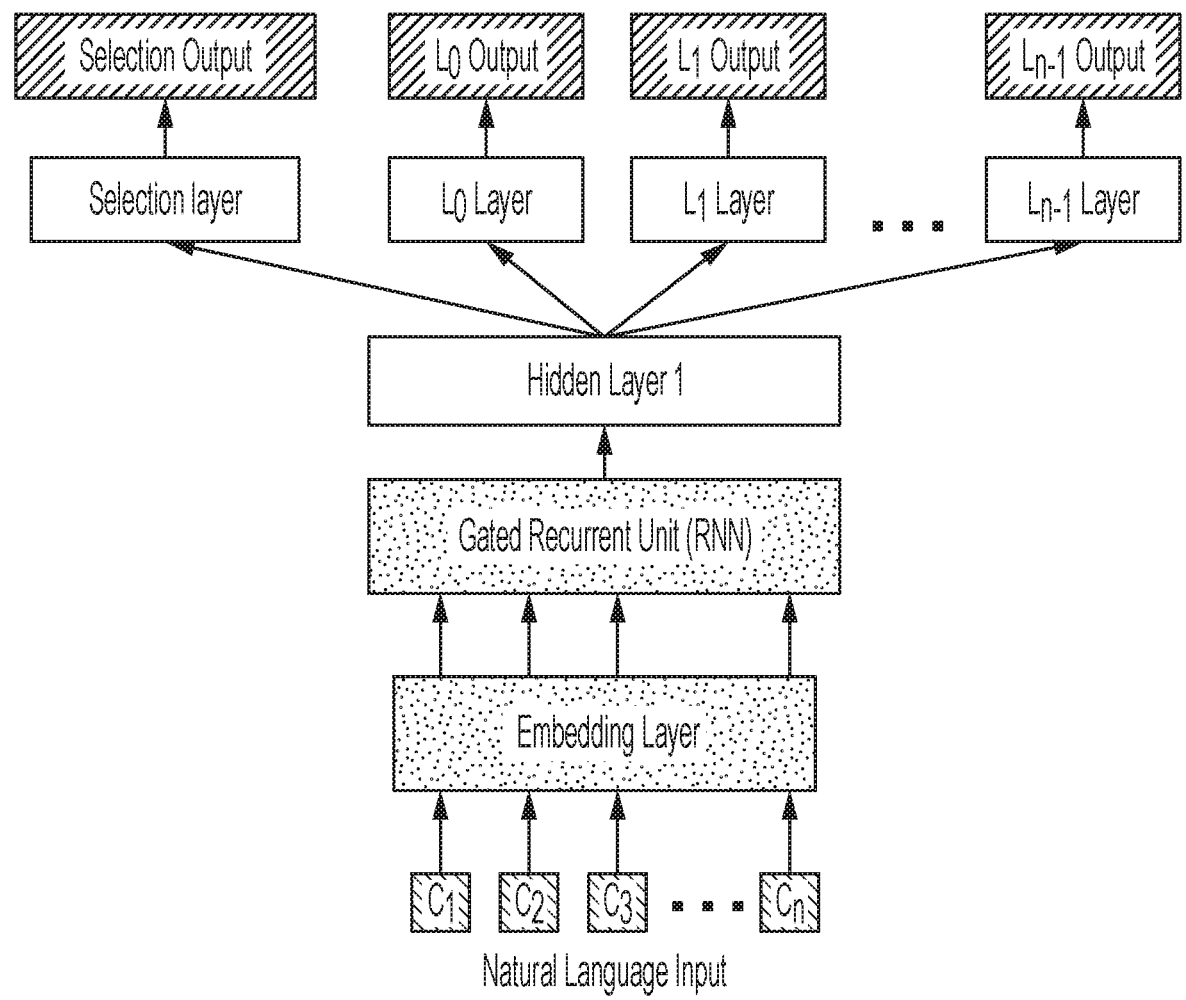

To do this, we use the architecture depicted in FIG. 2B; similar to the Multi-NN architecture, we instead use a Recurrent Neural Network encoder that takes the sequence of raw input tokens (in lieu of a bag-of-words representation), and maps them into a fixed-size state vector.

We leverage a Gated Recurrent Unit (GRU), a particular type of Recurrent Neural Network cell that is characterized by a hidden state incrementally updated with new inputs (i.e., words in a command). We utilize them specifically as they have been shown to work on natural language sequence modeling tasks. Similar to the Multi-NN, we train the model by minimizing the sum of the cross-entropy loss of each of the two terms described in objective Equation 5, with the same optimizer setup as the Multi-NN model. Once again, dropout is used to regularize the network, after the initial embedding layer, as well as after the output-specific hidden layers.

(3) Single-RNN: Single Output Recurrent Network:

Both the Multi-NN and the Multi-RNN approaches detailed above decompose the conditional probability of both the level of abstraction l and the reward function m given the natural language command c as $Pr(l, m|c) = Pr(l|c) Pr(m|l, c)$, allowing for the explicit calculation of the probability of each level of abstraction given the natural language command. Furthermore, as a result of this decomposition, both the Multi-NN and Multi-RNN create separate sets of parameters for each of the separate outputs—namely, this translates to separate sets of parameters for each of the levels of abstractions in the underlying hierarchical planner.

Alternatively, it is possible to use a model to directly estimate the joint probability $Pr(l, m|c)$. To do this, we propose a different type of recurrent neural network model that takes in a natural language command as a sequence of words, and directly outputs the joint probability of each tuple (l, m), where l denotes the level of abstraction, and m denotes the reward function at the given level. Specifically, if we represent the natural language command c as a sequence of words $s=(c_1, c_2 \ldots c_n)$, then the Single-RNN objective is to find a set of parameters θ such that:

$$\hat{\theta} = \arg\max_{\theta} \sum_{(n,l,m)} \log Pr(l, m \mid s, \theta) \quad (6)$$

With this Single-RNN model, we are able to significantly improve model efficiency compared to the Multi-RNN model, as all levels of abstraction share a single set of parameters. Furthermore, removing the explicit calculation of the level selection probabilities allows for the possibility of positive information transfer between levels of abstraction, which is not necessarily possible with the previous models.

Figure 2C:
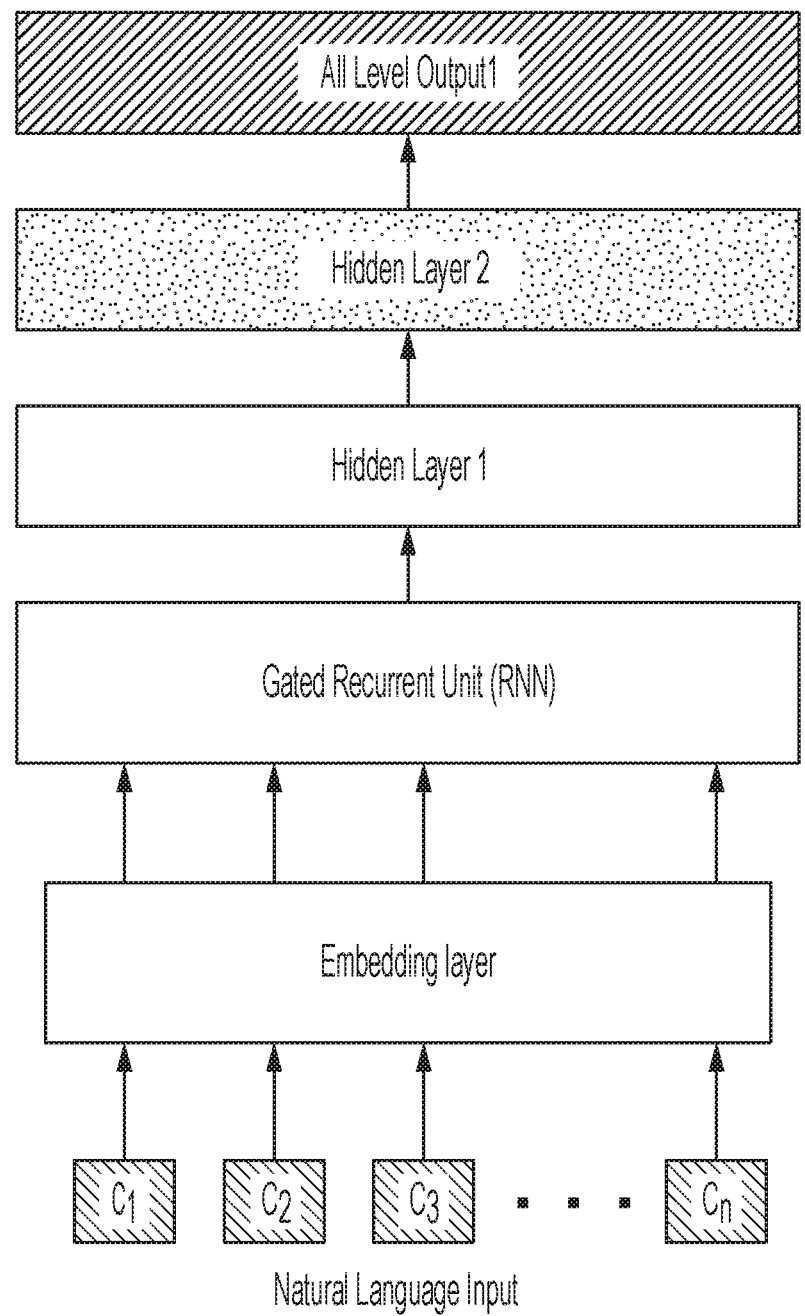

With this in mind, we use the architecture depicted in FIG. 2C. Namely, we employ a single-output recurrent neural network, similar to the Multi-RNN architecture, with the key difference that there is only a single output, with each element of the final output vector corresponding to the probability of each tuple of levels of abstraction and reward functions given the natural language command.

To train the Single-RNN model, we directly minimize the cross-entropy loss of the joint probability term described in objective Equation 6. Training hyperparameters are identical to the Multi-RNN model and dropout is applied to the initial embedding layer as well as the penultimate hidden layer.

FIG. 3 illustrates an exemplary Amazon Mechanical Turk (AMT) dataset statistics and examples.

In summary, our invention is a system for interpreting and grounding natural language commands to a mobile-manipulator (pick-and-place) robot at multiple levels of abstraction. Our system is not only the first work to ground language at multiple levels of abstraction, but also the first to utilize deep neural networks for language grounding on robots. Integrating such a language grounding system with a hierarchical planner allows for the specification and efficient execution of a wide range of robot tasks, fostering a very natural human to robot interaction.

The system can be extended via application to a large variety of real-world scenarios. Such a system would be effective in any environment where having multiple levels of abstraction make sense; for example, in surgical and household robotics. Additionally, the models described herein can operate on natural language commands specified at a mixture of abstraction levels to further reduce the constraints on natural language and facilitate a more natural human-robot interaction.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A system comprising:
    a robot comprising a module to interpret natural language commands, the module comprising a function for mapping natural language commands of varying complexities to reward functions at different levels of abstraction of states and actions within a hierarchical planning framework, wherein the hierarchical planning framework comprises an Abstract Markov Decision process, the function comprising:
    a deep neural network language model that learns how to map the natural language commands to reward functions at an appropriate level of the hierarchical planning framework to perform navigation and object manipulation tasks using the robot, the Abstract Markov Decision process comprising:
        a set of states that define an environment specified in an object-oriented fashion with object classes and attributes;
        a set of actions an agent can execute to transition between states or to invoke a lower-level AMDP subtask;
        a transition probability distribution over all possible next states given a current state and executed action;
        a numerical reward earned for a particular transition;
        a discount factor or effective time horizon under consideration; and
        a state projection function that maps lower-level states to higher-level (AMDP) states.

2. A system comprising:
a robot comprising a module comprising a function for mapping natural language commands of varying complexities to reward functions at different levels of abstraction of states and actions within a hierarchical planning framework to perform navigation and object manipulation tasks using the robot, wherein the hierarchical planning framework comprises an Abstract Markov Decision process, the function using a deep neural network language model that learns how to map the natural language commands to reward functions at an appropriate level of the hierarchical planning framework, the function further comprising an Abstract Markov Decision Process to represent a decision-making problem involving a hierarchy of the robot's states and actions, the Abstract Markov Decision Process comprising:
  a set of states that define an environment specified in an object-oriented fashion with object classes and attributes;
  a set of actions an agent can execute to transition between states or to invoke a lower-level AMDP subtask;
  a transition probability distribution over all possible next states given a current state and executed action;
  a numerical reward earned for a particular transition;
  a discount factor or effective time horizon under consideration; and
  a state projection function that maps lower-level states to higher-level (AMDP) states.

3. A method comprising:
providing a mobile-manipulator robot; and
providing a module comprising a function that interprets and grounds natural language commands to a mobile-manipulator robot at multiple levels of abstraction of states and actions, the function comprising a deep neural network language model that learns how to map the natural language commands to reward functions at an appropriate level of a hierarchical planning framework to perform navigation and object manipulation tasks using the mobile-manipulator robot, the function further comprising an Abstract Markov Decision process to represent a decision-making problem involving a hierarchy of the robot's states and actions, the Abstract Markov Decision process comprising:
  a set of states that define an environment specified in an object-oriented fashion with object classes and attributes;
  a set of actions an agent can execute to transition between states or to invoke a lower-level AMDP subtask;
  a transition probability distribution over all possible next states given a current state and executed action;
  a numerical reward earned for a particular transition;
  a discount factor or effective time horizon under consideration; and
  a state projection function that maps lower-level states to higher-level (AMDP) states.

* * * * *